US012624733B2

(12) United States Patent (10) Patent No.: US 12,624,733 B2
Verhoog et al. (45) Date of Patent: May 12, 2026

(54) DISCONNECT FLEXIBLE SENSOR TARGET

(71) Applicant: VALEO EMBRAYAGES, Amiens (FR)

(72) Inventors: Roel Verhoog, Amiens (FR); Michael Hennebelle, Amiens (FR)

(73) Assignee: VALEO EMBRAYAGES, Amiens (FR)

( * ) Notice: Subject to any disclaimer, the term of this patent is extended or adjusted under 35 U.S.C. 154(b) by 341 days.

(21) Appl. No.: 18/550,427

(22) PCT Filed: Mar. 14, 2022

(86) PCT No.: PCT/EP2022/056438
§ 371 (c)(1),
(2) Date: Sep. 13, 2023

(87) PCT Pub. No.: WO2022/194729
PCT Pub. Date: Sep. 22, 2022

(65) Prior Publication Data
US 2024/0159278 A1 May 16, 2024

(30) Foreign Application Priority Data

Mar. 15, 2021 (FR) ...................................... 21 02553

(51) Int. Cl.
*F16D 3/78* (2006.01)
*F16D 3/62* (2006.01)
*F16H 1/46* (2006.01)
(52) U.S. Cl.
CPC ................. *F16D 3/78* (2013.01); *F16D 3/62* (2013.01); *F16H 1/46* (2013.01)
(58) Field of Classification Search
CPC . F16D 3/78; F16D 3/62; F16D 27/118; F16D 11/14; F16H 1/46; F16H 48/24; F16H 48/30
See application file for complete search history.

(56) References Cited

U.S. PATENT DOCUMENTS 3,973,450 A * 8/1976 Shealy ..................... F16H 48/08
475/86
5,322,141 A * 6/1994 Brunner ............... B60K 17/046
180/65.6
(Continued)

FOREIGN PATENT DOCUMENTS

JP 59-7715 A 1/1984
JP 10-16602 A 1/1998
(Continued)

OTHER PUBLICATIONS

Japanese Decision of Refusal issued May 30, 2025 in Japanese Patent Application No. 2023-556864 with English translation, 8 pgs.

(Continued)

*Primary Examiner* — Farhana Pervin
(74) *Attorney, Agent, or Firm* — Oblon, McClelland, Maier & Neustadt, L.L.P.

(57) ABSTRACT

The invention relates to a transmission system for a motor vehicle including a first element and a second element movable in rotation with respect to each other about an axis X, and a coupling device which includes a first coupling part which is locked in rotation with the first element and movable with respect thereto between a coupled position and a decoupled position. Also included is a disk having a fixing region which is fixed axially to the first coupling part. The disk includes an annular portion forming a target and at least one elastic return portion which is configured to elastically return the first coupling part to the decoupled position. A sensor which is arranged facing the annular portion of the disk.

18 Claims, 5 Drawing Sheets

(56)  References Cited

U.S. PATENT DOCUMENTS

| | | | | |
|---|---|---|---|---|
| 5,890,989 A * | 4/1999 | Yamazaki | .............. | B60K 23/08 |
| | | | | 192/69.82 |
| 6,019,694 A * | 2/2000 | Forrest | .................... | F16H 48/22 |
| | | | | 475/234 |
| 2005/0187063 A1 * | 8/2005 | Haruki | .................... | F16H 48/30 |
| | | | | 475/231 |
| 2015/0114786 A1 | 4/2015 | Seidl | | |
| 2017/0219023 A1 * | 8/2017 | Haupt | .................... | F16H 48/34 |
| 2019/0309804 A1 * | 10/2019 | Shibata | ................. | B60K 17/02 |
| 2020/0079214 A1 * | 3/2020 | Johnson | ................. | B60K 17/00 |
| 2022/0176813 A1 * | 6/2022 | McBride | ............. | B60K 17/356 |
| 2023/0018219 A1 * | 1/2023 | Bertheau | .............. | F02B 75/045 |

FOREIGN PATENT DOCUMENTS

| | | | |
|---|---|---|---|
| JP | 2008-57692 A | 3/2008 |
| JP | 2010-84930 A | 4/2010 |
| JP | 2010-144782 A | 7/2010 |
| JP | 2015-87015 A | 5/2015 |
| JP | 2019-158007 A | 9/2019 |

OTHER PUBLICATIONS

International Search Report issued Jun. 14, 2022 in PCT/EP2022/056438, filed on Mar. 14, 2022, 2 pages.

Office Action issued Aug. 16, 2024, in corresponding Japanese Patent Application No. 2023-556864 (with English Translation), 12 pages.

* cited by examiner

Fig. 6
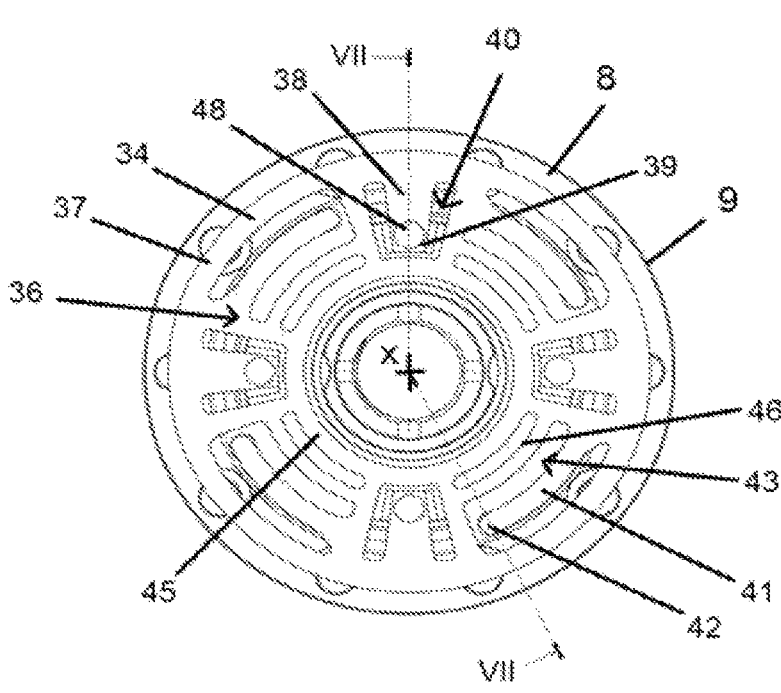
Fig. 7
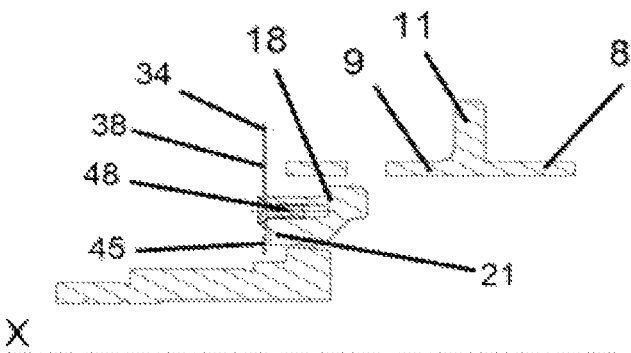
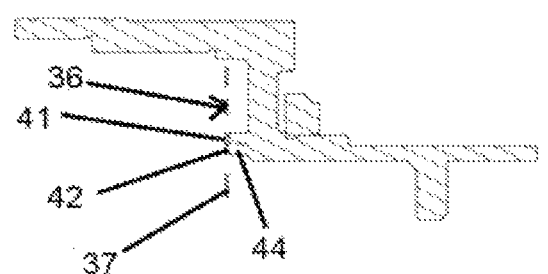

DISCONNECT FLEXIBLE SENSOR TARGET

TECHNICAL FIELD

The invention relates to the field of vehicle drivetrains.

It relates more particularly to a transmission system comprising a first element intended to be driven by a motor, a second element intended to drive at least one wheel shaft of a vehicle and a coupling device capable of selectively coupling the first element to the second element.

The invention relates in particular to a differential-type transmission system for transmitting and distributing a torque from a motor to two wheel shafts of an axle of the vehicle.

TECHNOLOGICAL BACKGROUND

Document US 2015114786 discloses a differential-type transmission system. The transmission system comprises a differential housing which is movable in rotation about an axis A and is equipped with a toothed wheel driven by a motor of the vehicle. Inside the housing are housed a carrier ring guided in rotation in the housing, two planet gears which are mounted in rotation on the carrier ring about an axis B perpendicular to the axis A, and two sun gears, each of which engages with the two planet gears and each of which is locked in rotation with a wheel shaft. In addition, the transmission system comprises a coupling device which makes it possible either to couple the housing of the transmission system to the carrier ring to allow transmission and distribution of the torque from the engine to the two wheel shafts of the axle or to decouple them in order to interrupt the transmission torque between the motor and the wheel shafts.

The coupling device is a dog clutch device. It comprises a first coupling part having an annular portion arranged outside the housing and projecting elements extending from the annular portion and passing through orifices formed in the housing, which makes it possible to rotationally secure the first coupling part and the housing. The projecting elements comprise teeth intended to cooperate with complementary grooves formed on the carrier ring. The first coupling part is axially movable with respect to the housing between a decoupled position and a coupled position in which the teeth of the first coupling part engage with the grooves of the carrier ring.

An electromagnetic actuator is capable of exerting an axial force on the first coupling part so as to move it from the decoupled position to the coupled position. Furthermore, the transmission system comprises an annular target which is axially fixed to the annular portion of the first coupling part. The annular target is arranged axially facing a sensor, such as a Hall effect sensor, which delivers a signal representative of an axial distance between the sensor and the annular target.

The transmission system further comprises an elastic washer which is arranged axially between the annular target and the housing. The function of this elastic washer is in particular to exert a return force on the first coupling part so as to return it to its decoupled position when the electromagnetic actuator no longer exerts a force on the first coupling part.

Such a transmission system is not fully satisfactory.

In particular, the coupling device of the transmission system has many different parts, in particular to ensure the target and return functions of the coupling device in its decoupled position, which increases its complexity, its cost and/or its bulk.

SUMMARY

An idea underlying the invention is to propose a transmission system equipped with a coupling device, a target and a sensor capable of delivering a signal representative of the state of the coupling device; this transmission system being simpler and/or less bulky.

According to one embodiment, the invention provides a transmission system for a motor vehicle, comprising:

a first element and a second element movable in rotation with respect to each other about an axis X, one of the first and second elements being intended to be driven by a motor and the other of the first and second elements being intended to drive at least one wheel shaft of the motor vehicle; and a coupling device which comprises:

a first coupling part which is locked in rotation with the first element and a second coupling part which is locked in rotation with the second element, the first coupling part being movable with respect to the first element between a coupled position in which the first coupling part is coupled to the second coupling part to transmit a torque between the first element and the second element and a decoupled position in which the first coupling part and the second coupling part are decoupled from each other, a disk which comprises a fixing region which is fixed axially to the first coupling part, the disk comprising an annular portion forming a target and at least one elastic return portion which is configured to deform elastically during the movement of the first coupling part from the decoupled position to the coupled position and to exert a return force capable of elastically returning the first coupling part to the decoupled position.

Thus, the disk has a dual functionality, namely, on the one hand, forming the target whose position is capable of being detected by a sensor so as to deliver a signal indicating the position of the first part of the coupling device and, on the other hand, ensuring that the first coupling part is returned to its decoupled position. This makes it possible to reduce the cost, complexity and bulk of such a transmission system.

According to various embodiments, such a transmission system may have one or more of the following features.

According to one embodiment, the transmission system comprises a sensor which is arranged facing the annular portion of the disk and which is configured to deliver a signal representative of a distance between the sensor and the annular portion forming a target.

According to one embodiment, the sensor is arranged axially facing the annular portion of the disk.

According to one embodiment, during the movement of the first coupling part from the decoupled position to the coupled position, the elastic return portion is elastically stressed between a bearing region of the transmission system and the fixing region. Preferably, said bearing region is fixed axially with respect to the second coupling part.

According to one embodiment, the disk is made of spring steel, such as XC 70 steel, which is advantageously pre-hardened. According to one embodiment, the disk has a thickness of between 0.4 and 1.2 mm, for example of the order of 0.8 mm. According to one embodiment, the disk is made of stainless steel which is a nonmagnetic metal, which also limits undesirable leakage of magnetic flux.

According to one embodiment, the disk comprises a plurality of elastic return portions each comprising an elastic blade capable of bearing against a bearing region of the transmission system. Thus, the elastic blades are subjected to an increasing bending force during the movement of the first coupling part from the decoupled position to the coupled position.

According to one embodiment, the bearing region is fixed axially with respect to the second coupling part.

According to one embodiment, each of the elastic blades comprises a free end. Preferably, said elastic blade bears against the bearing region of the transmission system via the ends of the elastic blades.

According to one embodiment, each elastic blade is formed in a window formed in the disk.

According to one embodiment, the elastic blades are regularly distributed around the axis X so as not to generate unbalance.

According to one embodiment, the coupling device comprises at least two elastic blades and preferably four elastic blades regularly distributed around the axis X and symmetrical in pairs with respect to the axis X.

According to one embodiment, the elastic blades are situated radially inside the annular portion forming a target, which makes it possible to limit the radial bulk of the disk.

According to one embodiment, each elastic blade extends in a direction having a circumferential component about the axis X. This makes it possible to obtain, for a given radial bulk, elastic blades of greater length and consequently of lower stiffness.

According to one embodiment, the disk and the elastic blades are dimensioned to generate a stiffness K1 opposing the axial movement of the first coupling part from the decoupled position to the coupled position which is between 5 and 50 N/mm.

According to one embodiment, the first element comprises a housing inside which the second coupling part is housed, the first coupling part comprising an inner portion which is housed inside the housing, an outer portion which is positioned outside the housing and a plurality of connecting portions which axially connect the inner portion and the outer portion of the first coupling part, each connecting portion passing through a corresponding through-opening formed in the housing.

According to one embodiment, one of the inner and outer portions of the first coupling part is annular and the other comprises lugs extending axially in the continuation of the connecting portions.

According to one embodiment, the disk is arranged outside the housing and is fixed to the outer portion of the first coupling part, each bearing region being positioned on the housing.

According to one embodiment, the housing comprises studs projecting axially toward the outside of the housing in the direction of the disk, each stud having one end forming one of the bearing regions. This makes it possible to avoid folding the elastic blades during the manufacture of the disk.

According to one embodiment, when the first coupling part is in the decoupled position, the elastic blades extend substantially in the plane of the annular portion of the target-forming disk.

According to one embodiment, the studs have an axial dimension greater than or equal to the travel of the first coupling part between the coupled position and the decoupled position.

According to one embodiment, the first element is a differential housing.

According to one embodiment, the second element comprises a carrier ring which is guided in rotation about the axis X inside the housing, two planet gears which are mounted in rotation on the carrier ring about an axis Z perpendicular to the axis X and two sun gears which are movable in rotation about the axis X, are each engaged with the two planet gears and are each intended to be locked in rotation with a wheel shaft. Thus, the transmission system forms a differential allowing the wheel shafts to rotate at different speeds.

According to one embodiment, the two planet gears each comprise bevel gear teeth which mesh with complementary bevel gear teeth of the two sun gears.

According to one embodiment, the second coupling part of the coupling device is locked in rotation with the carrier ring with respect to the axis X. Thus, when the coupling device is in the coupled position, the transmission system distributes the torque coming from the engine toward the two wheel shafts. Conversely, the transmission of the torque is interrupted between the housing and the carrier ring in the decoupled position of the coupling device.

According to one embodiment, the second coupling part of the coupling device is formed integrally with the carrier ring.

According to another embodiment, the second coupling part is locked in rotation with one of the sun gears. In such an embodiment, when the latter is in the coupled position, the torque is transmitted between the first element and the second element via the gears but the differential function is blocked by the coupling device, which prevents the wheel shafts from rotating at different speeds.

According to one embodiment, the disk comprises a plurality of fixing tabs which are fixed to the first coupling part.

According to one embodiment, each of the fixing tabs comprises a proximal end connected to the annular portion forming a target and a free end which is fixed to the first coupling part.

According to one embodiment, each fixing tab is formed in a window formed in the disk.

According to one embodiment, the fixing tabs extend radially. Preferably, the fixing tabs extend radially inwardly from a radially outer edge of the windows.

According to one embodiment, the fixing tabs are regularly distributed around the axis X so as not to generate unbalance.

According to one embodiment, the coupling device comprises at least two fixing tabs and preferably four fixing tabs regularly distributed around the axis X and symmetrical in pairs with respect to the axis X.

According to one embodiment, the fixing tabs are situated radially inside the annular portion forming a target, which makes it possible to limit the radial bulk of the disk.

According to one embodiment, the fixing tabs are fixed to the outer portion of the first coupling part, in particular to its lugs.

According to one embodiment, the outer portion of the first coupling part comprises lugs extending axially in the continuation of the connecting portions and passing through windows in which the fixing tabs extend.

Preferably, each fixing tab is situated circumferentially between two elastic blades. There is preferably a circle centered on the axis X intersecting all the elastic blades and all the fixing tabs.

According to one embodiment, the free end of each of the fixing tabs is clipped into a groove formed in the first coupling part, in particular in its lugs. The groove may be hollowed out radially.

According to another embodiment, the free end of each of the fixing tabs is fixed by a fixing member, such as a screw, to the first coupling part, in particular to one of its lugs.

According to one embodiment, the coupling device further comprises an actuator comprising a casing intended to be fixed to the chassis of the vehicle and a piston movable axially with respect to the casing between a retracted position and a deployed position and the piston bearing against an actuating region of the disk in such a manner that the movement of the piston from the retracted position to the deployed position causes the movement of the first coupling part of the coupling device from the decoupled position to the coupled position. Thus, the disk also makes it possible to transmit the actuating force between the actuator and the first coupling part, which makes it possible to reduce even further the cost, complexity and bulk of the transmission system.

According to one embodiment, the actuator comprises an electromagnet defining a housing inside which the piston is movable axially between the retracted position and the deployed position, the piston comprising an annular body made of ferromagnetic material. Such an electromagnetic actuator is particularly advantageous in that it exhibits excellent reactivity.

According to one embodiment, the actuator comprises a paramagnetic end piece which is fixed to the body of the piston and which cooperates with the actuating region of the disk. This prevents unwanted leakage of magnetic flux.

According to one embodiment, the actuator comprises a magnetic cap against which the body of the piston comes into abutment when the piston is in the deployed position. Thus, the magnetic cap holds the piston in the deployed position, which makes it possible to switch off the electromagnet.

According to one embodiment, the magnetic cap comprises a shoulder against which a shoulder of the body of the piston abuts when the piston is in the deployed position.

According to one embodiment, the disk is capable of deforming elastically between the actuating region and the fixing region of the disk during the movement of the piston of the actuator from the retracted position to the deployed position. Thus, the disk also makes it possible to compensate for the manufacturing tolerances of the coupling device.

According to one embodiment, the actuating region of the disk is separated from an abutment region of the first coupling part by an axial clearance which is dimensioned such that the disk deforms during the movement of the piston of the actuator from the retracted position to the deployed position to compensate for axial manufacturing tolerances of the coupling device and that the actuating region of the disk comes into abutment against the abutment region of the first coupling part when said axial manufacturing tolerances of the coupling device have been compensated for.

According to one embodiment, the axial clearance is between 0.2 and 1.5 mm.

According to one embodiment, the disk is dimensioned so as to generate a stiffness $K2$ opposing an axial approach of the piston toward the first coupling part which is between 50 and 500 N/mm.

The stiffness $K2$ is greater than the stiffness $K1$. Advantageously, the stiffness $K2$ is between $4*K1$ and $20*K1$, for example $10*K1$.

According to one embodiment, the actuating region of the disk is an inner annular portion. This makes it possible to limit the radial bulk of the coupling device.

According to one embodiment, the inner annular portion comprises oil passage grooves. The presence of oil makes it possible to limit the friction which can be generated between the piston and the disk.

According to one embodiment, the coupling device is a dog clutch device, one of the first and second coupling parts comprising teeth and the other comprising corresponding grooves in which said teeth are engaged when the first coupling part is in the coupled position.

According to one embodiment, the coupling device is a disconnection device capable of selectively interrupting the transmission of the torque between the first element and the second element.

According to one embodiment, the invention also relates to a motor vehicle and to a transmission system mentioned above.

According to one embodiment, the motor vehicle comprises an electric machine and the first element of the transmission system is capable of being driven by the electric machine.

The electric machine and the transmission system may be integrated within an electric axle.

According to a second aspect, the invention also provides a transmission system for a motor vehicle, comprising:

a first element and a second element movable in rotation with respect to each other about an axis X, one of the first and second elements being intended to be driven by a motor and the other of the first and second elements being intended to drive at least one wheel shaft of the motor vehicle; and a coupling device which comprises:

a first coupling part which is locked in rotation with the first element and a second coupling part which is locked in rotation with the second element, the first coupling part being movable with respect to the first element between a coupled position in which the first coupling part is coupled to the second coupling part to transmit a torque between the first element and the second element and a decoupled position in which the first coupling part and the second coupling part are decoupled from each other, a transmission member which comprises a fixing region which is fixed axially to the first coupling part, an actuator comprising a casing intended to be fixed to the chassis of the vehicle and a piston movable axially with respect to the casing between a retracted position and a deployed position, the piston bearing against an actuating region of the transmission member such that the movement of the piston from the retracted position to the deployed position causes the movement of the first coupling part of the coupling device from the decoupled position to the coupled position, the transmission member being capable of deforming elastically between the actuating region and the fixing region of the transmission member during the movement of the piston of the actuator from the retracted position to the deployed position.

Thus, the transmission member makes it possible to compensate for the manufacturing tolerances of the coupling device.

Preferably, the transmission member is a disk. An outer portion may form a sensor target.

This second aspect of the invention may comprise one or more of the features mentioned in the context of the first aspect of the invention.

According to a third aspect, the invention also provides a transmission system for a motor vehicle, comprising:

a first element and a second element movable in rotation with respect to each other about an axis X, one of the first and second elements being intended to be driven by a motor and the other of the first and second elements being intended to drive at least one wheel shaft of the motor vehicle; and a coupling device which comprises:

a first coupling part which is locked in rotation with the first element and a second coupling part which is locked in rotation with the second element, the first coupling part being movable with respect to the first element between a coupled position in which the first coupling part is coupled to the second coupling part to transmit a torque between the first element and the second element and a decoupled position in which the first coupling part and the second coupling part are decoupled from each other, a disk which comprises a fixing region which is fixed axially to the first coupling part and an annular portion forming a target, an actuator comprising a casing intended to be fixed to the chassis of the vehicle and a piston movable axially with respect to the casing between a retracted position and a deployed position, the piston bearing against an actuating region of the disk such that the movement of the piston from the retracted position to the deployed position causes the movement of the first coupling part of the coupling device from decoupled position to the coupled position.

Thus, the disk has a dual functionality, namely, on the one hand, forming the target whose position is detected by a sensor so as to deliver a signal indicating the position of the first part of the coupling device and, on the other hand, transmitting the actuating force between the piston of the actuator and the first coupling part, which makes it possible to reduce the cost, complexity and bulk of the transmission system.

This third aspect of the invention may comprise one or more of the features mentioned in the context of the first aspect of the invention.

In particular, the disk is capable of deforming elastically between the actuating region and the fixing region of the disk during the movement of the piston of the actuator from the retracted position to the deployed position.

According to a fourth aspect, the invention also provides a transmission system for a motor vehicle, comprising:

a first element and a second element movable in rotation with respect to each other about an axis X, one of the first and second elements being intended to be driven by a motor and the other of the first and second elements being intended to drive at least one wheel shaft of the motor vehicle; and a coupling device which comprises:

a first coupling part which is locked in rotation with the first element and a second coupling part which is locked in rotation with the second element, the first coupling part being movable with respect to the first element between a coupled position in which the first coupling part is coupled to the second coupling part to transmit a torque between the first element and the second element and a decoupled position in which the first coupling part and the second coupling part are decoupled from each other, a transmission member which comprises a fixing region which is fixed axially to the first coupling part, the transmission member comprising an elastic return portion which is configured to deform elastically during the movement of the first coupling part from the decoupled position to the coupled position and to exert a return force capable of elastically returning the first coupling part to the decoupled position, an actuator comprising a casing intended to be fixed to the chassis of the vehicle and a piston movable axially with respect to the casing between a retracted position and a deployed position, the piston bearing against an actuating region of the transmission member such that the movement of the piston from the retracted position to the deployed position causes the movement of the first coupling part of the coupling device from the decoupled position to the coupled position.

Thus, the transmission member has a dual functionality, namely, on the one hand, ensuring the return of the first coupling part to its decoupled position and, on the other hand, transmitting the actuating force between the piston of the actuator and the first coupling part, which makes it possible to reduce the cost, complexity and bulk of the transmission system.

This fourth aspect of the invention may comprise one or more of the features mentioned in the context of the first aspect of the invention.

In particular, the transmission member is capable of deforming elastically between the actuating region and the fixing region of the disk during the movement of the piston of the actuator from the retracted position to the deployed position. There are thus two distinct elastic stiffnesses ensuring, on the one hand, the elastic return of the first coupling part and, on the other hand, the compensation of the tolerances of the dimension chain.

Preferably, the transmission member is a disk. An outer portion of the disk may form a sensor target.

BRIEF DESCRIPTION OF THE FIGURES

The invention will be understood better, and further aims, details, features and advantages thereof will become more clearly apparent from the following description of a number of particular embodiments of the invention, which are given only by way of nonlimiting illustration, with reference to the appended drawings.

FIG. 6 is a partial side view of a coupling device according to a variant embodiment illustrating the housing, the disk and the first coupling part of the coupling device.

FIG. 7 is a broken sectional view with intersecting planes, along the sectional planes VII-VII of FIG. 6.

DESCRIPTION OF THE EMBODIMENTS

Figure 1:
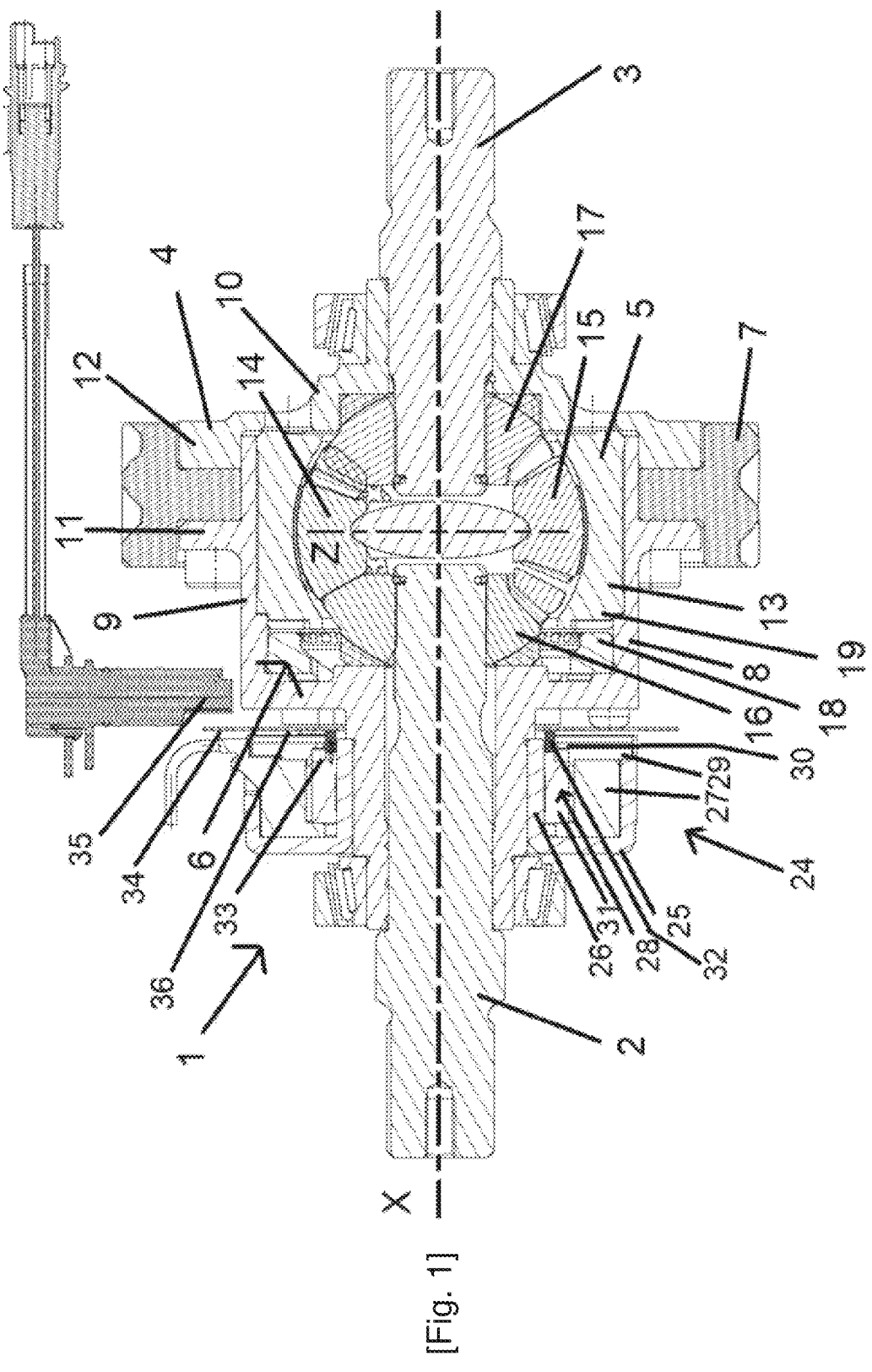
FIG. 1 is an overall view, in section, of a transmission system equipped with a coupling device according to a first embodiment.

In the description and the claims, the terms "outer" and "inner" as well as the "axial" and "radial" orientations will be used to designate, according to the definitions given in the description, elements of the transmission system. By convention, the "radial" orientation is directed orthogonally to the axis X of rotation of the transmission system determining the "axial" orientation and, from the inside outward away from said axis, the "circumferential" orientation is directed orthogonally to the axis X and orthogonally to the radial direction.

FIGS. 1 to 5 illustrate a transmission system 1 according to a first embodiment. The transmission system is here a differential which is used, in a drivetrain of a vehicle, to transmit and distribute a torque coming from a motor, not illustrated, to two wheel shafts 2, 3 of an axle of a motor vehicle. Such a transmission system may, for example, form part of a secondary drivetrain capable of transmitting a torque from a secondary motor of the vehicle, such as an electric motor, to a rear or front axle of a vehicle while a primary drivetrain is capable of transmitting a torque from a main motor, for example a combustion engine, to the wheel shafts of another axle of the vehicle. According to other embodiments not shown, the transmission system may also take a form other than that of a differential.

The transmission system comprises a first element 4, movable in rotation about the axis X, and intended to be driven by a motor, such as an electric motor (not shown), a second element 5, also mobile in rotation about the axis X and intended to drive the wheel shafts 2, 3, and a coupling device 6 capable of selectively coupling or decoupling the first element 4 and the second element 5

The first element 4 comprises a toothed wheel 7 which is intended to be driven by the motor via a reduction gear train, not shown. This first element 4 also comprises a housing 8 which is fixed in rotation to the toothed wheel 7. The housing 8 comprises two parts 9, 10 which are fixed to each other. For this purpose, in the embodiment shown, each of the two parts 9, 10 comprises an external flange 11, 12 by which the two parts 9, 10 are fixed to the toothed wheel 7 and to each other.

The second element 5 comprises a carrier ring 13 of annular shape which is guided in rotation, about the axis X, inside the housing 8. For this purpose, the housing 8 comprises an inner cylindrical portion cooperating with a cylindrical outer surface of the carrier ring 13 in order to guide it in rotation with respect to the housing 8. The second element 5 further comprises two planet gears 14, 15, visible in FIG. 1, which are mounted in rotation on the carrier ring 13 about an axis Z perpendicular to the axis X. The two planet gears 14, 15 each comprise bevel gear teeth which mesh with complementary bevel gear teeth of two sun gears 16, 17. The two sun gears 16, 17 are movable in rotation about the axis X and are each locked in rotation with one of the two wheel shafts 2, 3. The carrier ring 13, the planet gears 14, 15 and the sun gears 16, 17 form a differential allowing the two wheel shafts 2, 3 to rotate at different speeds.

Furthermore, the transmission system 1 comprises a coupling device 6 which, in the coupled position, makes it possible to transmit a torque between the first element 4 and one of the elements of the second element 5, in this case the carrier ring 13. Thus, the transmission system makes it possible, when the coupling device 6 is in the coupled position, to transmit a torque from the motor to the wheel shafts 2, 3 by exercising the function of a differential allowing different speeds of rotation of the wheel shafts 2, 3. However, in another embodiment (not shown), the coupling device is configured to couple the first element 4 to one of the two sun gears 16, 17. The sun gears 16, 17 then have two sets of teeth, preferably axially back to back. One cooperates with the planet pinions, the other cooperates with the first coupling part. In such an embodiment, the carrier ring 13 is locked in rotation with the housing 8 and the coupling device then aims to prevent the two wheel shafts 2, 3 from rotating at different speeds.

Returning to the embodiment shown, it can be seen that the coupling device 6 comprises a first coupling part 18 which is locked in rotation with the housing 8 while being movable axially along the axis X with respect to said housing 8. The first coupling part 18 is movable between a decoupled position, shown in FIG. 2, and a coupled position, shown in FIG. 3. In the decoupled position, the first coupling part 18 is decoupled from a second coupling part 19 locked in rotation with the carrier ring 13 so that the transmission of torque is interrupted between the housing 8 and the carrier ring 13. On the other hand, in the coupled position, the first coupling part 18 is coupled to the second coupling part 19, which allows the transmission of the torque between housing 8 and the carrier ring 13.

In the embodiment shown, the coupling device 6 is a dog clutch device. Thus, one of the first and second coupling parts 18, 19 comprises teeth while the other comprises corresponding grooves in which said teeth are engaged when the first coupling part 18 is in the coupled position. In the embodiment shown, the second coupling part 19 is formed integrally with the carrier ring 13. In other words, teeth or grooves are formed in the lateral face of the carrier ring 13 which faces the first coupling part 18. However, although the invention is described in connection with a dog clutch coupling device, it is not limited thereto and the coupling device may be of another type and in particular be a friction coupling device.

Figure 5:
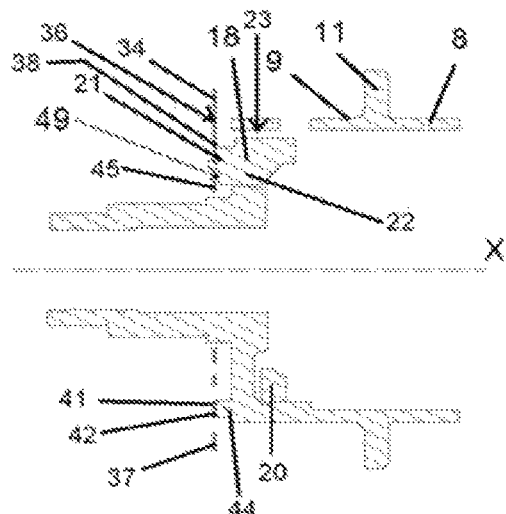
FIG. 5 is a broken sectional view with intersecting planes along the sectional planes V-V of FIG. 4, illustrating in particular the housing, the disk and the first coupling part of the coupling device.

As shown in FIG. 5, the first coupling part 18 comprises an inner portion 20 which is housed inside the housing 8, an outer portion 21 which is positioned outside the housing 8 and connecting portions 22 which are regularly distributed around the axis X and which each pass through a corresponding through-opening 23 formed in the housing 8, which makes it possible to rotationally fix the first coupling part 18 to the housing 8 while allowing a relative axial movement between the first coupling part 18 and the housing 8. In the embodiment shown, the inner portion 20 is annular while the outer portion 21 comprises lugs extending axially in the continuation of the connecting portions 22. However, according to another variant embodiment, the structure is inverted and the outer portion 21 is annular while the inner portion 20 comprises a plurality of axially oriented lugs extending in the continuation of the connecting portions 22.

Figure 2:
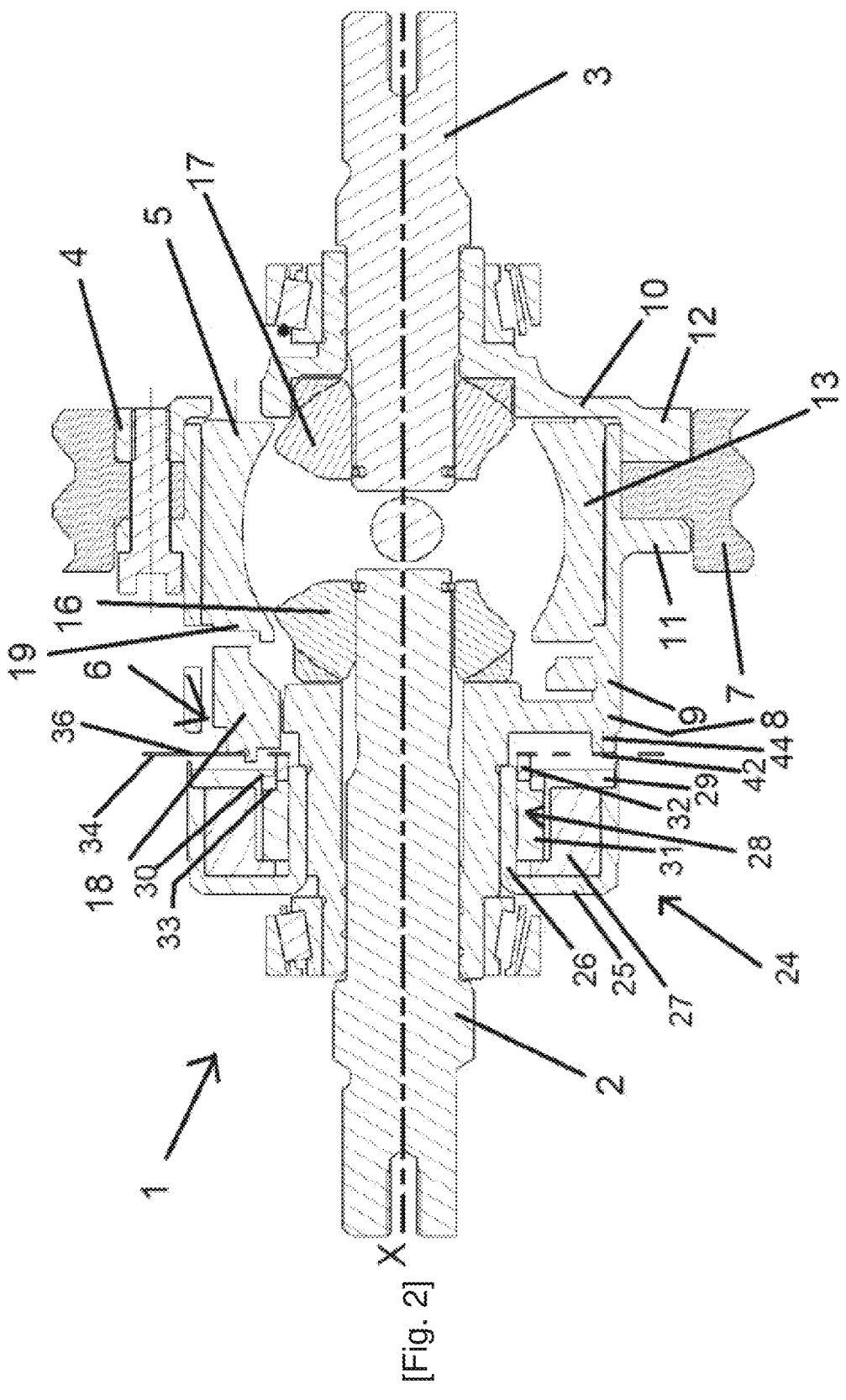
FIG. 2 is a broken sectional view with intersecting planes of the transmission system of FIG. 1 when the coupling device is in the decoupled position.
Figure 3:
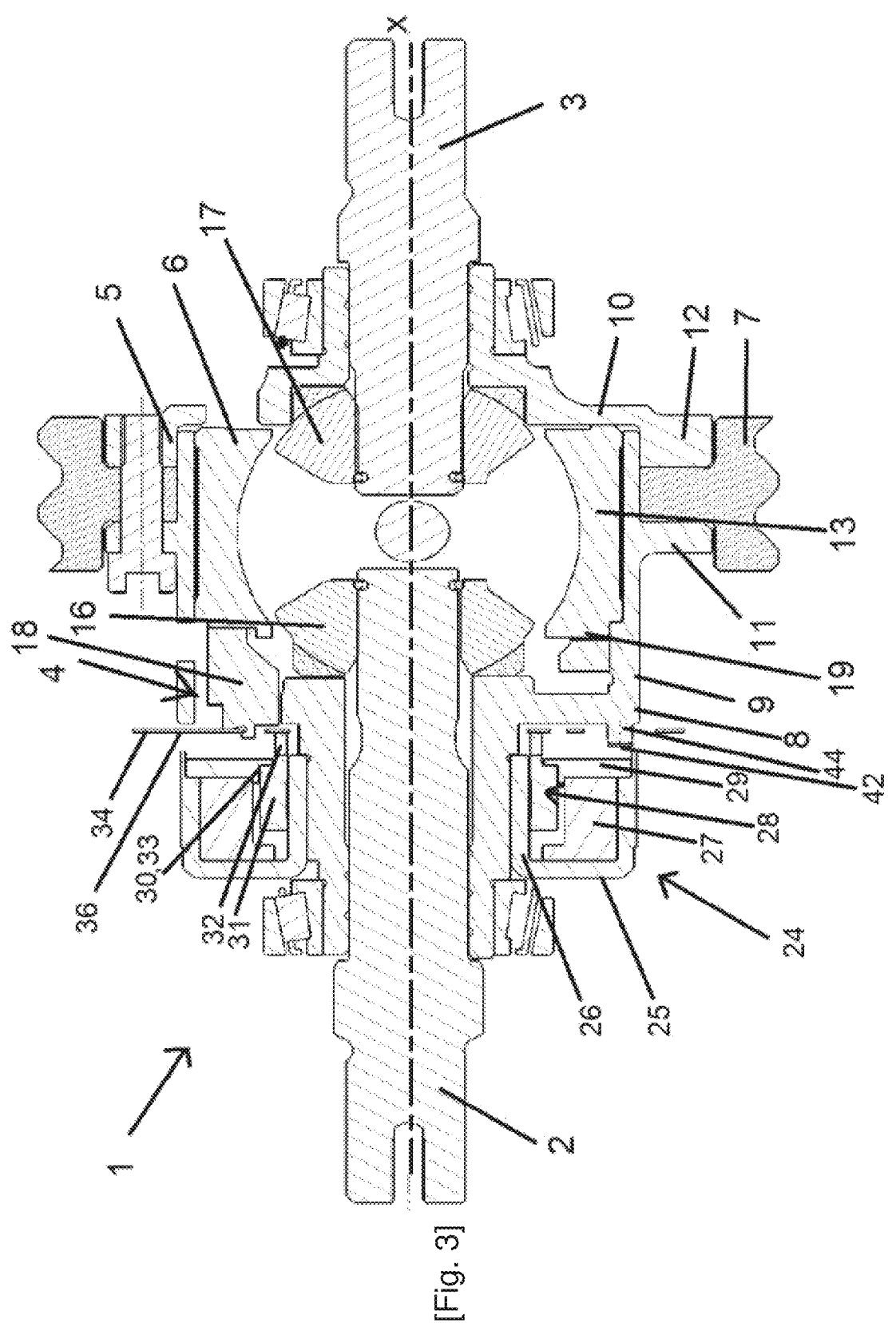
FIG. 3 is a sectional view similar to that of FIG. 2 when the coupling device is in the coupled position.

Furthermore, the coupling device 6 comprises an actuator 24, illustrated in FIGS. 1 to 3, making it possible to move the first coupling part 18 axially. The actuator 24 comprises a casing 25 which is intended to be mounted on the chassis of the vehicle, fixed in rotation with respect to the latter, by means of fixing members (not shown). The casing 25 comprises an inner skirt 26 which is fitted around a portion of the part 9 of the housing 8. The inner skirt 26 comprises a cylindrical guide portion which cooperates with a corresponding cylindrical portion of the housing 8 and thus allows the housing 8 to rotate with respect to the fixed casing 25 of the actuator 24.

The actuator 24 is an electromagnetic actuator. It comprises an electromagnet 27 defining an inner housing and a piston 28 movable axially inside the inner housing between a retracted position, illustrated in FIG. 2, and a deployed position, illustrated in FIG. 3. The actuator 24 further comprises a magnetic cap 29 which closes the inner housing and which comprises a stop 30, such as a shoulder, to define the deployed position of the piston 28. The piston 28 comprises a body 31, of annular shape, made of ferromagnetic material, such as iron or steel for example. The piston 28 further comprises a paramagnetic end piece 32, also of annular shape, which is fixed to the body 31 of the piston 28 and by means of which the actuating force is transmitted to the first coupling part 18. The paramagnetic end piece 32 of the piston 28 thus makes it possible to avoid undesirable leakage of magnetic flux toward the other components of the coupling device 6. Furthermore, the body 31 of the piston 28 comprises a shoulder 33 intended to come into abutment against the shoulder 30 of the magnetic cap 29 when the piston 28 is in the deployed position.

When the electromagnet 27 is energized with a current greater than a threshold current, it makes it possible to move the piston 28 from the retracted position, illustrated in FIG. 2, to the deployed position, illustrated in FIG. 3. When the piston 28 is in the deployed position, the magnetic cap 29 exerts an attraction on the body 31 of the piston 28, which makes it possible to keep it in the deployed position. The current supplied to the electromagnet 27 may then be reduced as long as it remains greater than said threshold current. When the electromagnet 27 is de-energized or when it is supplied with a current lower than the threshold current, an elastic return means, described below, which returns the first coupling part 18 to the decoupled position, makes it possible to overcome the force of attraction between the magnetic cap 29 and the body 31 of the piston 28 and to return the piston 28 from the deployed position to the retracted position.

The coupling device 6 is also equipped with a target 34 which is fixed axially to the first coupling part 18. Furthermore, the coupling device 6 comprises a contactless sensor 35, shown in FIG. 1, which is positioned axially facing the target 34 and which is configured to deliver a signal representative of the axial distance between the target 34 and the sensor 35. Thus, the sensor 35 is capable of delivering a signal representative of the position of the first coupling part 18, such a signal being used to ensure the reliability of the control of the coupling device 6 and in particular to check that the coupling device 6 is indeed in the decoupled position or in the coupled position. The sensor 35 is, for example, a Hall effect sensor.

Figure 4:
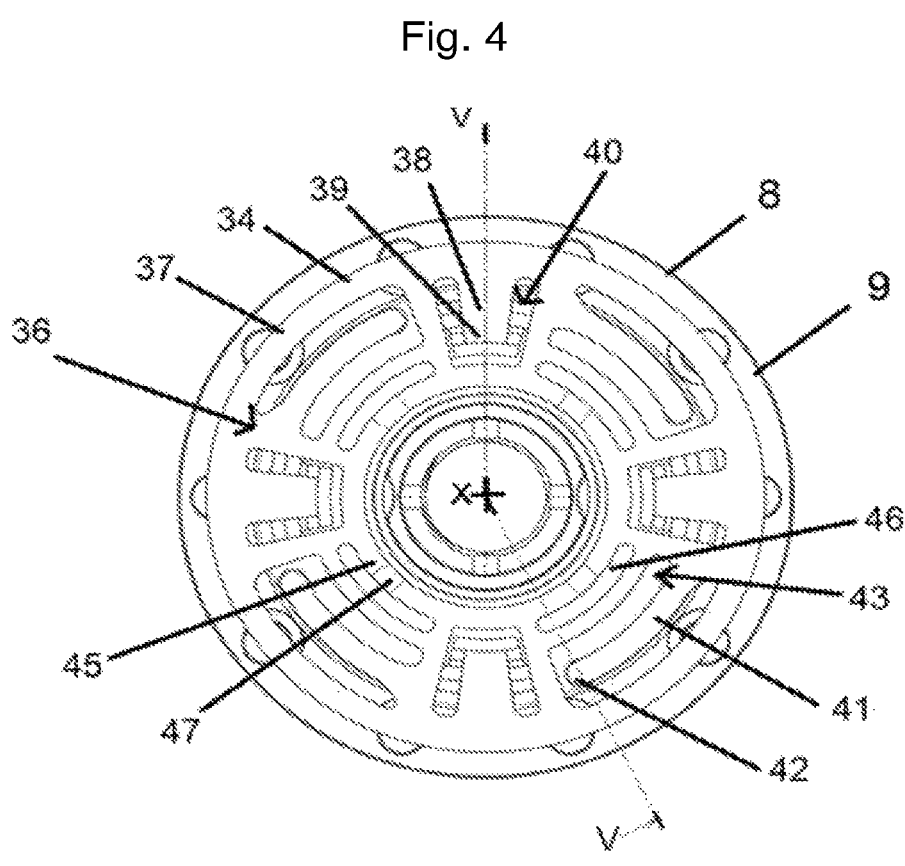
FIG. 4 is a partial side view of the coupling device of FIGS. 1 to 3 illustrating the disk and the first coupling part of the coupling device.

Furthermore, the coupling device 6 comprises a disk 36, visible in full in FIG. 4, which is formed in a single piece and is fixed axially to the first coupling part 18. The disk 36 provides numerous functionalities described below and thus makes it possible to limit the cost, complexity and bulk of the coupling device 6.

Firstly, the disk 36 performs the function of a target 34. For this purpose, the disk comprises an annular portion 37 formed at the radially outer periphery of the disk 36. This annular portion 37 is arranged axially facing the sensor 35 and thus forms the target 34.

Secondly, the disk 36 performs the function of elastic return means making it possible to return the first coupling part 18 to the decoupled position when the piston 28 of the actuator 24 returns to the retracted position.

For this purpose, the disk 36 comprises elastic blades 41, four in number in the embodiment shown. The elastic blades 41 each have a free end 42 which bears against a bearing region of the housing 8 and a proximal end connected to the remainder of the disk 36. The elastic blades 41 are each formed in windows 43 positioned radially inside the annular portion 37. The elastic blades 41 extend circumferentially about the axis X, which makes it possible to obtain, for a given radial bulk, elastic blades 41 of greater length and consequently of lower stiffness. As shown in FIGS. 2, 3 and 5, the free end 42 of the elastic blades 41 bears against the ends of studs 44 projecting axially from the housing 8 toward the disk 36. The studs 44 project by an axial dimension greater than the travel of the first coupling part 18 between the decoupled position and the coupled position. Advantageously, as shown in FIG. 3, the axial dimension of the studs 44 is such that, when the coupling device 6 is in the decoupled position, the elastic blades 41 extend substantially in the plane of the annular portion 37 forming the target 34.

The elastic blades 41 thus each form an elastic return portion which is configured to bend elastically during the movement of the first coupling part 18 from the decoupled position to the coupled position. In reaction, the elastic blades 41 exert a return force capable of returning said first coupling part 18 to the decoupled position.

Furthermore, the disk 36 comprises a plurality of fixing tabs 38, visible in FIG. 4, also four in number in the embodiment shown. The fixing tabs 38 are distributed circumferentially around the axis X and each comprise a free end 39 defining a fixing region which is fixed to the outer portion 21 of the first coupling part 18. The fixing tabs 37 are formed in windows 40 formed in a portion of the disk 36 arranged radially inside the annular portion 37 forming the target 34. Each of the windows 40 associated with the tabs is thus arranged circumferentially between two windows 43 associated with the elastic blades. The fixing tabs 38 project radially inward from a radially outer edge of said windows 40. Furthermore, the lugs of the outer portion 21 pass through said windows 40. In addition, as shown in FIGS. 2, 3 and 4, the lugs of the outer portion 21 each comprise a groove into which the free end 39 of one of the fixing tabs 38 is clipped, which makes it possible to fix the disk 36 to the first coupling part 18, simply, without any additional fixing member.

By way of example, according to one embodiment, the disk 36 and more particularly the fixing tabs 38 and the elastic blades 41 are dimensioned to generate a stiffness K1 opposing the axial movement of the first coupling part 18 toward the coupled position of between 5 and 50 N/mm.

Thirdly, the disk 36 also makes it possible to transmit the actuating force between the piston 28 of the actuator 24 and the first coupling part 18. For this purpose, the piston 28 of the actuator 24 is in contact against an inner annular portion 45 of the disk 36 which defines an actuating region. Furthermore, the disk 36 is capable of deforming elastically between said actuating region and the free ends 39 of the fixing tabs 38 when the piston 28 of the actuator 24 is moved from the retracted position to the deployed position. This makes it possible to compensate for the tolerances of the dimension chain of the coupling device 6 by ensuring that the piston 28 and the first coupling part 18 move over their entire travel during their respective movement toward the deployed position and the coupled position. In other words, this makes it possible to guarantee both that the piston 28 is, in the deployed position, in abutment against the magnetic cap 29 of the actuator 24, and that the first coupling part 18 is, in the coupled position, in axial abutment against the second coupling part 19. As shown in FIG. 5, the inner annular portion 45 of the disk 36 is separated from an abutment region of the first coupling part 18 by an axial clearance 49 which is greater than the axial manufacturing tolerances of the coupling device 6. The axial clearance 49 is, for example, between 0.2 and 1.5 mm. Thus, during the movement of the piston 28 of the actuator 24 from the retracted position to the deployed position, the disk 36 and in particular its inner annular portion 45 deforms in order to compensate for axial manufacturing tolerances of the coupling device, then the inner annular portion 45 of the disk 36 comes into abutment against the abutment region of the first coupling part 18 when said axial manufacturing tolerances of the coupling device 6 have been compensated for.

According to an advantageous embodiment, the disk 36 has cutouts 46, shown in particular in FIG. 4, extending circumferentially in a region positioned radially between the inner annular portion 45 of the disk 36 which defines the actuating region and the windows 43. Such cutouts 46 are advantageous in that they increase further still the flexibility of the disk 36.

By way of example, according to one embodiment, the disk 36 is dimensioned so as to generate a stiffness K2 opposing an axial approach of the piston 28 of the actuator 24 toward the first coupling part 18 which is between 50 and 500 N/mm. The stiffness K2 is greater than the stiffness K1. Advantageously, the stiffness K2 is between 4*K1 and 20*K1.

Fourthly, the disk 36 proposes a sliding interface limiting the frictional forces caused by the relative rotation of the disk 36, which is movable in rotation about the axis X, with respect to the piston 28 which for its part is fixed in rotation. According to an advantageous variant, in order to limit further still the friction liable to be generated between the piston 28 and the disk 36, the annular portion 45 of the disk 36 comprises, on its face directed facing the piston 28, oil passage grooves 47, shown in FIG. 4.

The disk 36 is, for example, made of spring steel, such as XC 70 steel, advantageously prehardened. By way of example, the disk 36 has a thickness of between 0.4 and 1.2 mm, for example of the order of 0.8 mm. Alternatively, the disk 36 is made of stainless steel.

FIGS. 6 and 7 show a coupling device 6 according to another embodiment. This coupling device 6 differs from that described above in relation to FIGS. 1 to 5 only in the way in which the disk 36 is fixed to the first coupling part 18. In this embodiment, the free end 39 of each of the fixing tabs 38 is fixed by a fixing member 48, such as a screw, to the outer portion 21 of the first coupling part 18, which makes it possible to ensure greater rigidity of the fixing of the disk 36 to the first coupling part 18.

Although the invention has been described in connection with several particular embodiments, it is quite obvious that it is in no way limited thereto and that it comprises all the technical equivalents of the means described as well as their combinations if these fall within the scope of the invention, as defined by the claims.

In the claims, any reference sign between parentheses should not be interpreted as limiting the claim.

The invention claimed is:

1. A transmission system for a motor vehicle, comprising:
   a first element and a second element movable in rotation with respect to each other about an axis X, one of the first and second elements being intended to be driven by a motor and the other of the first and second elements being intended to drive at least one wheel shaft of the motor vehicle; and
   a coupling device which comprises:
   a first coupling part which is locked in rotation with the first element and a second coupling part which is locked in rotation with the second element, the first coupling part being movable with respect to the first element between a coupled position in which the first coupling part is coupled to the second coupling part to transmit a torque between the first element and the second element and a decoupled position in which the first coupling part and the second coupling part are decoupled from each other,
   a disk which comprises a fixing region which is fixed axially to the first coupling part, the disk comprising an annular portion forming a target and at least one elastic return portion which is configured to deform elastically during the movement of the first coupling part from the decoupled position to the coupled position and to exert a return force capable of elastically returning the first coupling part to the decoupled position,
   wherein the disk comprises a plurality of elastic return portions each comprising an elastic blade capable of bearing against a bearing region of the transmission system, said bearing region being axially fixed with respect to the second coupling part
   wherein the first element comprises a housing which includes studs projecting axially toward the outside of the housing in the direction of the disk, each stud having one end forming one of the bearing regions.

2. The transmission system as claimed in claim 1, comprising a sensor which is arranged facing the annular portion of the disk and which is configured to deliver a signal representative of a distance between the sensor and the annular portion forming a target.

3. The transmission system as claimed in claim 2, wherein the disk comprises a plurality of elastic return portions each comprising an elastic blade capable of bearing against a bearing region of the transmission system, said bearing region being axially fixed with respect to the second coupling part.

4. The transmission system as claimed in claim 2, wherein the first element comprises a housing inside which the second coupling part is housed, the first coupling part comprising an inner portion which is housed inside the housing, an outer portion which is positioned outside the housing and a plurality of connecting portions which axially connect the inner portion and the outer portion of the first coupling part, each of the connecting portions passing through a corresponding through-opening formed in the housing.

5. The transmission system as claimed in claim 1, wherein the second coupling part is housed inside the housing, the first coupling part comprising an inner portion which is housed inside the housing, an outer portion which is positioned outside the housing and a plurality of connecting portions which axially connect the inner portion and the outer portion of the first coupling part, each of the connecting portions passing through a corresponding through-opening formed in the housing.

6. The transmission system as claimed in claim 5, wherein the disk is arranged outside the housing and is fixed to the outer portion of the first coupling part, each bearing region being positioned on the housing.

7. The transmission system as claimed in claim 6, wherein the second element comprises a carrier ring which is guided in rotation about the axis X inside the housing, two planet gears which are mounted in rotation on the carrier ring about an axis Z perpendicular to the axis X and two sun gears which are movable in rotation about the axis X, are each engaged with the two planet gears and are each intended to be locked in rotation with a wheel shaft.

8. The transmission system as claimed in claim 5, wherein the second element comprises a carrier ring which is guided in rotation about the axis X inside the housing, two planet gears which are mounted in rotation on the carrier ring about an axis Z perpendicular to the axis X and two sun gears which are movable in rotation about the axis X, are each engaged with the two planet gears and are each intended to be locked in rotation with a wheel shaft.

9. The transmission system as claimed in claim 8, wherein the second coupling part of the coupling device is locked in rotation with the carrier ring with respect to the axis X.

10. The transmission system as claimed in claim 1, wherein the disk comprises a plurality of fixing tabs which are fixed to the first coupling part.

11. The transmission system as claimed in claim 1, wherein the coupling device comprises an actuator comprising a casing intended to be fixed to the chassis of the vehicle and a piston movable axially with respect to the casing between a retracted position and a deployed position and wherein the piston bears against an actuating region of the disk such that movement of the piston from the retracted position to the deployed position causes the movement of the first coupling part of the coupling device from the decoupled position to the coupled position; and wherein the disk is capable of deforming elastically between the actuating region and the fixing region of the disk during the movement of the piston of the actuator from the retracted position to the deployed position.

12. The transmission system as claimed in claim 11, wherein the actuating region of the disk is separated from an abutment region of the first coupling part by an axial clearance which is dimensioned such that the disk deforms during the movement of the piston of the actuator from the retracted position to the deployed position in order to compensate for axial manufacturing tolerances of the coupling device and that the actuating region of the disk comes into abutment against the abutment region of the first coupling part when said axial manufacturing tolerances of the coupling device have been compensated for.

13. The transmission system as claimed in claim 11, wherein the disk is dimensioned to generate a stiffness opposing axial approach of the piston toward the first coupling part which is between 50 and 500 N/mm.

14. The transmission system as claimed in claim 11, wherein the actuating region of the disk is an inner annular portion.

15. The transmission system as claimed in claim 14, wherein the inner annular portion comprises oil passage grooves.

16. The transmission system as claimed in claim 1, wherein the coupling device is a dog clutch device, one of the first and second coupling parts comprising teeth and the other comprising corresponding grooves in which said teeth are engaged when the first coupling part is in the coupled position.

17. The transmission system as claimed in claim 1, wherein the coupling device is a disconnection device capable of selectively interrupting the transmission of the torque between the first element and the second element.

18. A motor vehicle comprising an electric machine and a transmission system as claimed in claim 1, the first element of the transmission system being driven by the electric machine.

\* \* \* \* \*